US011990329B2

(12) United States Patent
Stewart et al.

(10) Patent No.: US 11,990,329 B2
(45) Date of Patent: May 21, 2024

(54) ION TRAP

(71) Applicant: Thermo Fisher Scientific (Bremen) GmbH, Bremen (DE)

(72) Inventors: Hamish Stewart, Bremen (DE); Dmitry Grinfeld, Bremen (DE); Alexander Wagner, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 145 days.

(21) Appl. No.: 17/693,999

(22) Filed: Mar. 14, 2022

(65) Prior Publication Data

US 2022/0319828 A1 Oct. 6, 2022

(30) Foreign Application Priority Data

Mar. 30, 2021 (GB) .................................... 2104522

(51) Int. Cl.
*H01J 49/42* (2006.01)
*H01J 29/84* (2006.01)

(52) U.S. Cl.
CPC .......... *H01J 49/4255* (2013.01); *H01J 29/84* (2013.01); *H01J 49/4295* (2013.01); *H01J 49/4245* (2013.01)

(58) Field of Classification Search
CPC ............ H01J 49/49255; H01J 49/4295; H01J 49/4245; H01J 49/4225; H01J 29/84; H01J 49/4255
See application file for complete search history.

(56) References Cited

U.S. PATENT DOCUMENTS

| | | | | |
|---|---|---|---|---|
| 9,613,788 | B2 * | 4/2017 | Welkie | H01J 49/40 |
| 2007/0181803 | A1 | 8/2007 | Hasegawa et al. | |
| 2011/0186733 | A1 * | 8/2011 | Schwartz | H01J 49/423 250/290 |
| 2012/0112059 | A1 * | 5/2012 | Sugiyama | H01J 49/0095 250/288 |

(Continued)

FOREIGN PATENT DOCUMENTS

| | | |
|---|---|---|
| EP | 0817239 A1 | 1/1998 |
| EP | 1806765 A2 | 7/2007 |

(Continued)

*Primary Examiner* — David E Smith
(74) *Attorney, Agent, or Firm* — Thomas F. Cooney

(57) ABSTRACT

The ion trap comprises a multipole electrode assembly, a first confining electrode, and a second confining electrode. The multipole electrode assembly is configured to confine ions of the first polarity to an ion channel extending in an axial direction of the multipole electrode assembly. The first confining electrode is provided adjacent to the multipole electrode assembly and extends in the axial direction of the multipole electrode assembly. The second confining electrode is provided adjacent to the multipole electrode assembly and extends in the axial direction of the multipole electrode assembly aligned with the first confining electrode. The first and second confining electrodes are spaced apart in the axial direction in order to define an ion confining region of the ion channel between the first and second confining electrodes. The first and second confining electrodes are configured to receive a DC potential of the first polarity to further confine ions within the ion channel in the ion confining region.

20 Claims, 8 Drawing Sheets

(56) References Cited

U.S. PATENT DOCUMENTS

| | | | | |
|---|---|---|---|---|
| 2012/0248307 | A1 | 10/2012 | Ding et al. | |
| 2014/0353491 | A1* | 12/2014 | Hager | H01J 49/063 250/288 |

FOREIGN PATENT DOCUMENTS

| | | | |
|---|---|---|---|
| EP | 3462476 | A1 | 4/2019 |
| GB | 2570435 | A | 7/2019 |
| GB | 2573485 | A | 11/2019 |

* cited by examiner

ION TRAP

CROSS-REFERENCE TO RELATED APPLICATIONS

The present application claims, under 35 U.S.C. § 119(a), priority to and the benefit of the filing date of United Kingdom application GB2104522.4, which was filed on Mar. 30, 2021, the disclosure of which is hereby incorporated by reference herein in its entirety.

FIELD OF THE DISCLOSURE

The present disclosure relates to ion traps and methods of ion trapping. In particular, the present disclosure relates to ion traps for use in a mass spectrometer.

BACKGROUND

Ion traps may be used to accumulate ions prior to their injection into a mass analyser. In particular, such ions traps (often referred to as extraction traps) may be used to accumulate ions prior to their injection into an orbital trapping mass analyser or a Time of Flight mass analyser. Accumulation of ions in an extraction trap can be useful for conversion of a continuous ion beam into a concentrated, cooled ion cloud with spatial properties matched to the acceptance properties of the mass analyser.

Linear ion traps known in the art may utilise a combination of RF potentials to confine ions in a radial direction using some form of multipole electrode assembly. Axial confinement in a multipole electrode assembly may be provided by DC potentials applied to end electrodes at opposing ends of the multipole electrode assembly. Ions confined within the ion trap can be accumulated and cooled for injection into an associated mass analyser.

Typically, ions confined within an ion trap cool to the central axis of the ion trap via collisions with a buffer gas, such as nitrogen or helium. Thermalization of the ions is normally achieved after a number of oscillations along the trap's axis between the retarding electrostatic fields generated by the DC potentials applied to the end electrodes. When brought to thermal equilibrium with the buffer gas, the ions can be extracted from the ion trap through application of further DC fields.

One problem with such an arrangement is that in order to confine the ions in the ion trap, the ions must be cooled after injection. In particular, the ions must be sufficiently cooled while travelling along axial direction of the ion trap such that the ions are cool enough to be reflected by the end DC potentials.

One known option to provide the desired cooling is to increase the pressure in the ion trap. However, increasing the pressure in the ion trap causes scatting of ions in the ion trap and also ion fragmentation.

Another option is to increase the length of the ion trap, such that the increased travel time along the ion trap provides increased time for the ions to cool. However, such a solution increases the length of the cooled ion cloud in the axial direction. Increasing the size of the cooled ion cloud is not desirable, as such cooled ion cloud will not match the spatial acceptance properties of the mass analyser.

A further option to improve ion confinement is disclosed in EP-A-3462476. EP-A-3462476 discloses an ion trap in which the aperture voltages are increased after all ions have entered the trap. This allows the creation of an axial trapping barrier that ions do not have to first overcome, allowing ions to enter the trap with less energy and requiring less cooling/gas pressure to be retained within the trap.

A further option to improve ion confinement is disclosed in GB-A-2570435. GB-A-2570435 discloses an ion trap including an auxiliary pin electrode located towards the centre of the ion trap. A DC potential of opposite polarity is applied to the pin electrode to confine ions in the region of the ion trap around the pin electrode.

In view of the above, it is an object of the present disclosure to provide an improved ion trap, or at least a commercially useful alternative thereto.

SUMMARY

According to a first aspect of the disclosure, an ion trap for cooling ions of a first polarity for mass spectrometry is provided. The ion trap comprises a multipole electrode assembly, a first confining electrode, and a second confining electrode. The multipole electrode assembly is configured to confine ions of the first polarity to an ion channel extending in an axial direction of the multipole electrode assembly. The first confining electrode is provided adjacent to the multipole electrode assembly and extends in the axial direction of the multipole electrode assembly. The second confining electrode is provided adjacent to the multipole electrode assembly and extends in the axial direction of the multipole electrode assembly aligned with the first confining electrode. The first and second confining electrodes are spaced apart in the axial direction in order to define an ion confining region of the ion channel between the first and second confining electrodes. The first and second confining electrodes are configured to receive a DC potential of the first polarity to further confine ions within the ion channel in the ion confining region.

The ion trap of the first aspect of the disclosure provides first and second confining electrodes which use a repulsive DC potential (i.e. the DC potential is the same polarity as the ions) to confine ions to an ion confining region of the ion channel between the first and second confining electrodes. The DC potentials applied provide a way to cool and confine ions to the ion confining region of the ion trap. As such, the length of the ion confining region of the ion trap is not determined by the length of the multipole electrode assembly, but by the spacing between the first and second confining electrodes. That is to say, the length of the ion trap is decoupled from the length of the ion confining region.

The first and second confining electrodes confine ions to a region (portion) of the ion channel (i.e. the ion confining region) along the axial length of the ion channel. That is to say, the ion confining region has a length in the axial direction that is shorter than the length of the ion channel (e.g. a length of the multipole electrode assembly). By using first and second confining electrodes to define an ion confining region within the ion trap, the length of the ion trap (i.e. the length of the ion channel defined by the multipole electrode assembly) may be increased to allow for additional time to cool ions travelling within the ion trap, without adversely affecting the length of the ion confining region.

It will be appreciated that when ions are confined to the confining region of the ion trap, the space charge of the confined ions increases. This increase in space charge effectively has a voltage potential associated with it, which is present in the ion confining region of the ion trap. Advantageously, in the ion trap of the first aspect, the first and second confining electrodes are not aligned with the ion confining region of the ion trap, but rather are spaced apart from it. As such, the DC potentials applied to the first and second confining electrodes do not overlap with the voltage potential of the space charge. As such, an increase in space charge due to an increase in confinement of the ions in the ion confining region does not perturb the trapping potentials applied to the first and second confining electrodes, as the first and second confining electrodes do not overlap with the ion confining region.

Furthermore, the first and second confining electrodes of the first aspect are configured to receive a repulsive DC potential. By using repulsive DC potentials to confine the ions, the potential field between e.g. the first confining electrode and adjacent electrodes of the multipole electrode assembly does not trap ions. By contrast, when attractive DC potentials are used (such as in the ion trap of GB-A-2570435) the present inventors have realised that such potential attract ions both axially and radially. Thus, ions that are not strongly contained by the RF pseudopotential, particularly ions with higher mass to charge ratios, experience a reduced constraining barrier in the radial direction of the DC pin electrode. As such, ions (particularly high mass to charge ratio ions) may be attracted out of the ion trap towards the DC pin electrode when an attractive DC potential is used to confine ions. By using repulsive DC potentials, the ion trap of the first aspect can confine ions of a wider range of mass to charge ratios without the potential to lose ions radially.

In some embodiments, the ion trap is configured to cool analyte ions within the ion confining region and subsequently eject the cooled analyte ions to a mass analyser for mass analysis. As such, the ion trap may be configured to be operated as an extraction trap for forming packets of ions for injection into a mass analyser.

In some embodiments, the first confining electrode and the second confining electrode are electrically connected together. As such, the first and second confining electrodes may have the same DC potential applied to them. In some embodiments, the first and second confining electrodes may be connected by an electrical cable, while in other embodiments, the first and second electrodes may be formed integrally, such that they are directly in electrical connection with each other. Providing the same DC potential to the first and second confining electrodes simplifies the control of the ion trap.

In some embodiments, the first confining electrode and/or the second confining electrode extend in the axial direction by a distance of at least 2 mm. As such, the first and/or second confining electrodes may be elongate confining electrodes which extend in the axial direction (i.e. the first and second confining electrodes are elongated in the axial direction). In some embodiments, the first and/or second confining electrodes may be elongated such that they extend in the axial direction a greater distance than they extend in a circumferential direction about a central axis of the ion channel. By providing the first and/or second confining electrodes extending in the axial direction, the first and/or second confining electrodes may provide a DC potential which focuses ions towards the ion confining region.

In some embodiments, the first confining electrode and/or the second electrode is spaced apart from a central axis of the ion channel by a variable distance along the ion channel. It will be appreciated that, relative to the electrodes of the multipole electrode assembly, the first and/or second confining electrodes may protrude or be recessed in the radial direction of the ion. As such, the radial spacing of the first and/or second confining electrodes may vary along the axial direction of the ion trap while the radial spacing of the electrodes of the multipole electrode assembly may be generally constant along the axial direction of the ion trap. By providing a variable radial spacing for the first and/or second confining electrodes, the first and/or second confining electrodes may be further configured to focus ions towards the ion confining region of the ion trap.

In some embodiments, the spacing of the first confining electrode and/or the second electrode from the central axis of the ion channel increases from the ends of the multipole electrode assembly towards the ion confining region of the ion channel. As such, the first and/or second confining electrodes are generally recessed towards the ion confining channel. In some embodiments, the variable spacing of the first confining electrode and/or the second confining electrode may be provided by forming the respective electrode as a generally wedge shaped electrode. By providing first and/or second confining electrodes in this manner, the ion trap may provide repulsive DC potentials which guide ions towards the ion confining region.

In some embodiments, a plurality of first confining electrodes are provided, the plurality of first confining electrodes distributed evenly about a central axis of the multipole electrode assembly, and a plurality of second confining electrodes are provided, the plurality of second confining electrodes distributed evenly about the central axis of the multipole electrode assembly. Each of the first confining electrodes may be aligned with a respective second confining electrode in the axial direction. In some embodiments, the plurality of first confining electrodes may be provided in pairs, each pair arranged on opposing sides of the ion trap. In some embodiments, the plurality of second confining electrodes may be provided in pairs, each pair arranged on opposing sides of the ion trap. For example, at least 2, 4, 6 or 8 first and/or second confining electrodes may be provided.

In some embodiments, the first confining electrode and the second confining electrode are provided by a slotted electrode arranged in the axial direction, the slotted electrode comprising a first confining electrode region and a second confining electrode region separated by a slot formed in the slotted electrode, the slot aligned with the ion confining region of the of the ion channel. As such, the first and second confining electrodes may be provided in an integrated manner. The slot is provided to ensure that the DC potential applied to the slotted electrode does not affect the ion confining region. In some embodiments, the slot of the slotted electrode is about the same length as the intended size of the ion confining region.

In some embodiments, the slotted electrode is a plate electrode. As such, the slotted electrode may be provided in an economic manner which can be easily integrated into the multipole electrode assembly. For example, the slotted electrode can be arranged between adjacent electrodes of the multipole electrode assembly.

In some embodiments, a plurality of slotted electrodes may be provided. In some embodiments, the plurality of slotted electrodes distributed evenly about a central axis of the multipole electrode assembly. In some embodiments, the plurality of slotted electrodes may be provided in pairs, each pair arranged on opposing sides of the ion trap. For example, at least 2, 4, 6 or 8 slotted electrodes may be provided.

In some embodiments, the ion trap further comprises first and second end electrodes arranged at opposing ends of the multipole electrode assembly. The first and second end electrodes may be used to control the injection and/or extraction of ions into/from the ion trap in the axial direction. In other embodiments, the multipole electrode assembly in combination with the first and second confining electrodes may be used to control the injection of ions into the ion trap. For example, the first and second confining electrodes may also be individually controllable to eject ions in the axial direction of the ion trap (e.g. by applying a potential across the first and second confining electrodes). In some embodiments, ion transport devices (e.g. other ion traps, multipoles, or fragmentation chambers etc.) adjacent to the ion trap may be used to control the injection/ejection of ions from the ion trap.

In some embodiments, the ion trap may further comprise a controller. The controller may be configured to apply an RF potential to the multipole electrode assembly to confine ions within the ion channel. The controller may also be configured to apply a first DC potential to the first and second end electrodes. The controller may also be configured to apply a second DC potential to the first and second confining electrodes. As such, RF potentials and the first and second DC potentials of the ion trap may be controlled by the controller in order to confine ions within the ion confining region. The controller may also be configured to control a first DC potential applied to the end electrodes of the ion trap. The first DC potential applied to the end electrodes may be controlled to allow ions to be injected into the ion trap, and subsequently confined within the ion trap. The second DC potential applied to the first and second confining electrodes may then further confine ion within the ion confining region of the ion trap.

In some embodiments, the first DC potential is greater than the second DC potential. Thus, the first and second DC potentials in combination define an electrostatic field which focuses ions towards the ion confining region between the first and second confining electrodes.

In some embodiments the controller is configured to apply the second DC potential to the first and second confining electrodes during a first time period in which ions are entering the ion trap, and to apply a third DC potential to the first and second confining electrodes during a second time period after ions have entered the trap, wherein the third DC potential is greater than the second DC potential. Accordingly, the effect of the first and second confining electrodes may be reduced during the first time period in which ions are injected into the ion trap. After ions are injected into the ion trap and have begun to cool, the DC potential applied to the first and second confining electrodes can be increased in order to strengthen the confining effect. For example, in some embodiments, the second DC potential may be a relatively low DC potential, for example no greater than 2 V, or even 0 V. After ions have been injected into the ion trap, the second DC potential may then be increased to the third potential, for example at least 10 V. In some embodiments, the second time period in which the third DC potential is applied may commence immediately after ions have finished entering the ion trap. In some embodiments, there may be a delay between the first and second time periods to allow the injected ions to cool in the ion trap. For example, there may be a delay between the first and second time periods of at least 0.5 ms, or more preferably, at least 1 ms, or at least 2 ms, to allow ions to begin to cool towards the ion confining region. In some embodiments, the delay may be no greater than 10 ms, such that time taken to confine ions does not become excessive.

In some embodiments, the multipole electrode assembly is a quadrupole electrode assembly, a hexapole electrode assembly, or an octupole electrode assembly. The multiple electrode assembly may comprise a plurality of pole rod pairs, wherein each pole rod pair extends in the axial direction. The first and second confining electrodes may be arranged between adjacent electrodes of the multipole electrode assembly (e.g. between adjacent pole rods).

According to a second aspect of the disclosure, a mass spectrometer is provided. The mass spectrometer comprises an ion trap according to the first aspect, and a mass analyser configured to receive ions from the ion trap. The ion trap of the mass spectrometer may incorporate any of the optional features discussed above in relation to the first aspect. The mass analyser may receive ions that have been cooled in the ion trap of the first aspect.

According to a third aspect of the disclosure, a method of injecting ions into an ion trap is provided. The method comprises:

- injecting ions of a first polarity into a multipole electrode assembly of the ion trap where the ions are confined in an ion channel extending in an axial direction of the multipole electrode assembly;
- wherein the ion trap further comprises:
  - a first confining electrode provided adjacent to the multipole electrode assembly and extending in the axial direction of the multipole electrode assembly;
  - a second confining electrode provided adjacent to the multipole electrode assembly and extending in the axial direction of the multipole electrode assembly aligned with the first confining electrode,
  - wherein the first and second confining electrodes are spaced apart in the axial direction in order to define an ion confining region of the ion channel between the first and second confining electrodes,
  - wherein ions are further confined to an ion confining region of the ion channel by applying a DC potential of the first polarity to the first and second confining electrodes to bias ions within the ion channel towards the ion confining region.

According to the third aspect of the disclosure, a method of injecting ions into an ion trap is provided. The method of the third aspect may be performed using the ion trap of the first aspect or the mass spectrometer of the second aspect. The method of the third aspect provides a method of injecting ions into an ion trap, wherein the ions are cooled and confined to the ion confining region which is independent of the overall length of the ion trap. By cooling ions in this manner, the ions may then be used for further analysis, e.g. by ejecting the ions into a mass analyser.

In some embodiments, the ions are confined within ion channel of the multipole electrode assembly by first and second end electrodes arranged at opposing ends of the multipole electrode assembly.

In some embodiments, an RF potential is applied to the multipole electrode assembly to confine ions within the ion channel. In some embodiments, a first DC potential is applied to the first and second end electrodes to confine the ions within the ion channel. In some embodiments, a first DC potential is applied to the first and second confining electrodes.

In some embodiments, the second DC potential is applied to the first and second confining electrodes during a first time period in which ions are entering the ion trap. A third DC potential may then be applied to the first and second confining electrodes during a second time period after ions have entered the trap, wherein the third DC potential is greater than the second DC potential.

BRIEF DESCRIPTION OF THE FIGURES

The invention may be put into practice into a number of ways and specific embodiments will now be described by way of example only and with reference to the Figures in which.

DETAILED DESCRIPTION

Figure 2:
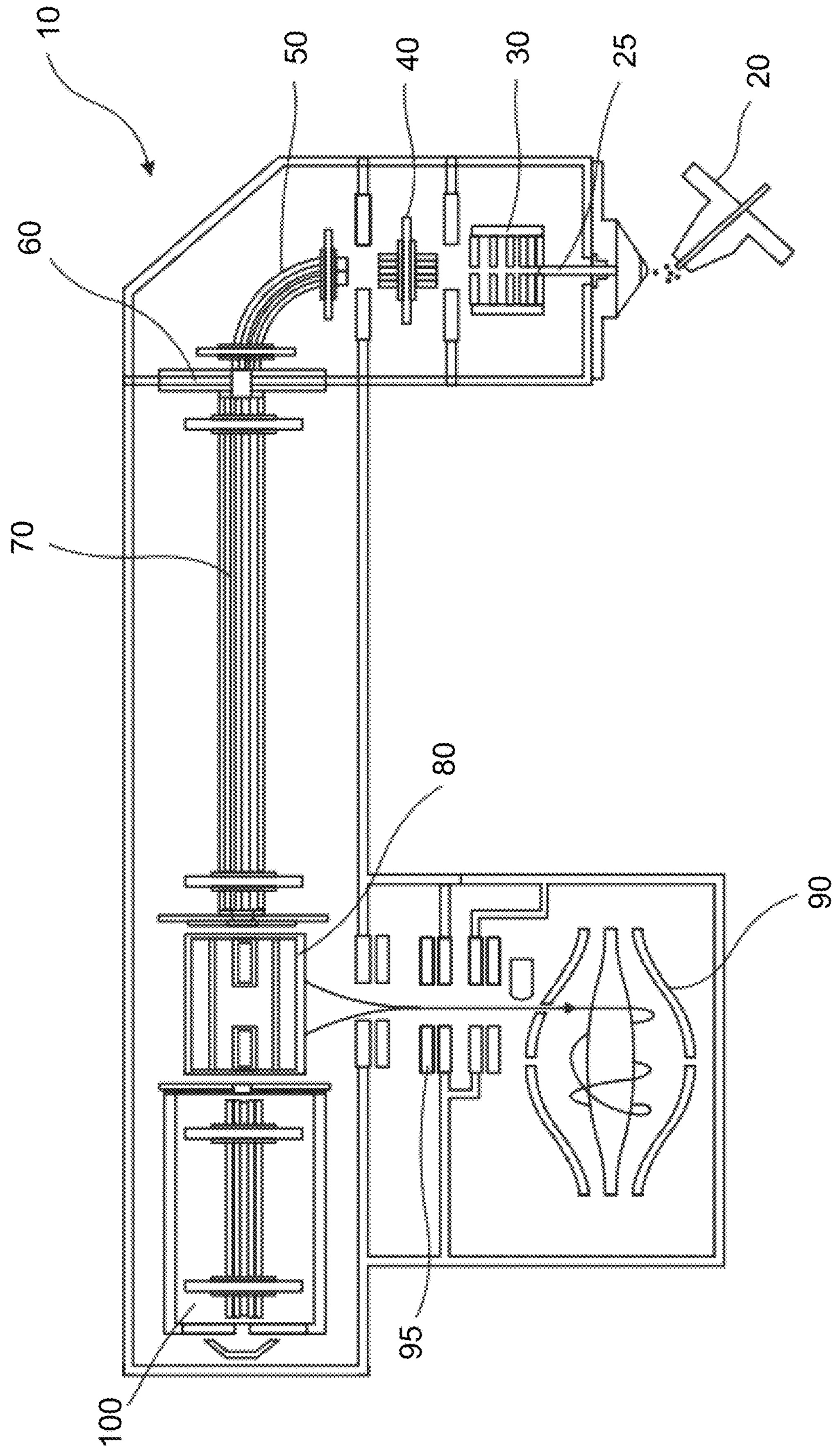
FIG. 2 shows a schematic arrangement of a mass spectrometer according to an embodiment of the present disclosure.

FIG. 2 shows a schematic arrangement of the mass spectrometer 10 according to an embodiment of this disclosure.

In FIG. 2, a sample to be analysed is supplied (for example from an autosampler) to a chromatographic apparatus such as a liquid chromatography (LC) column (not shown in FIG. 2). One such example of an LC column is the Thermo Fisher Scientific, Inc., PROSWIFT® Monolithic Column which offers high performance liquid chromatography (HPLC) through the forcing of the sample carried in a mobile phase under high pressure through a stationary phase of irregularly or spherically shaped particles constituting the stationary phase. In the HPLC column, sample molecules elute at different rates according to their degree of interaction with the stationary phase. For example, a sample molecule may be a protein or a peptide molecule.

The sample molecules thus separated by liquid chromatography are then ionized using an Electro-Spray Ionization (ESI) source 20, which is at atmospheric pressure to form sample ions.

The sample ions generated by the ESI source 20 are transported to an ion trap 80 by ion transportation means of the mass spectrometer 10. According to the ion transportation means, sample ions generated by the ESI source 20 enter a vacuum chamber of the mass spectrometer 10 and are directed by a capillary 25 into an RF-only S lens 30. The ions are focused by the S lens 30 into an injection flatapole 40 which injects the ions into a bent flatapole 50 with an axial field. The bent flatapole 50 guides (charged) ions along a curved path through it whilst unwanted neutral molecules such as entrained solvent molecules are not guided along the curved path and are lost. An ion gate 60 is located at the distal end of the bent flatapole 50 and controls the passage of the ions from the bent flatapole 50 into a transport multipole 70. In the embodiment shown in FIG. 2, the transport multipole 70 is a transport octupole. The transfer multipole 70 guides the analyte ions from the bent flatapole 50 into the ion trap 80. In the embodiment shown in FIG. 2, the ion trap 80 is configured to cool ions for extraction into the mass analyser 90.

It will be appreciated that the above described ion transportation means is one possible implementation for transporting ions from an ion source to the ion trap 80 according to the present embodiment. Other arrangements of ion transportation optics or variations on the above assembly, suitable for transported ions from a source of ions to an ion trap 80 will be apparent to the skilled person. For example, the ion transportation means shown in FIG. 2 could be modified, or replaced by other ion optical components as required. For example, at least one of a mass selector, such as a quadrupole mass filter and/or a mass selecting ion trap, and/or an ion mobility separator, could be provided between for example the bent flatapole 50 and the transfer multipole 70 to provide the capability to select ions from the ion source 20 to be guided into the ion trap 80.

The ion trap 80 is configured to confine and to cool ions injected into it. The detailed operation and construction of the ion trap 80 will be explained in more detail below. Cooled ions confined in the ion trap 80 may be ejected orthogonally from the ion trap 80 towards the mass analyser 90. As shown in FIG. 2, the mass analyser is an orbital trapping mass analyser 90 for example, the Orbitrap® Mass Analyser sold by Thermo Fisher Scientific, Inc. The orbital trapping mass analyser 90 is an example of a Fourier transform mass analyser. The orbital trapping mass analyser 90 has an off-centre injection aperture in its outer electrode, and the ions are injected into the orbital trapping mass analyser as coherent packets, through the off-centre injection aperture. Ions are then trapped within the orbital trapping mass analyser by a hyperlogarithmic electrostatic field, and undergo back and forth motion in a longitudinal direction whilst orbiting around the inner electrode. The axial component of the movement of the ion packets in the orbital trapping mass analyser is (more or less) defined as simple harmonic motion, with the angular frequency in the axial direction being related to the square root of the mass-to-charge ratio of given ion species. Thus, over time, ions separate in accordance with their mass-to-charge ratio.

In the configuration described above, the sample ions are analysed by the orbital trapping mass analyser 90 without fragmentation. The resulting mass spectrum is denoted MS1.

Although an orbital trapping mass analyser 90 is shown in FIG. 2, other Fourier transform mass analysers may be employed instead. For example, a Fourier transform ion cyclotron resonance (FTICR) mass analyser may be utilized as a mass analyser. Other types of electrostatic traps can also be used as Fourier transform mass analysers. Fourier transform mass analysers, such as the orbital trapping mass analyser 90 and ion cyclotron resonance mass analyser, may also be used in the invention even where other types of signal processing other than Fourier transformation are used to obtain mass spectral information from the transient signal (see for example WO-A-2013/171313, Thermo Fisher Scientific). In other embodiments, the mass analyser may be a Time-of-Flight (ToF) analyser. The ToF mass analyser may be a ToF having an extended flight path, such as a multi-reflection ToF mass analyser.

In a second mode of operation of the ion trap 80, ions passing through the transport multipole 70 into the ion trap 80 may also continue their path through the ion trap 80 to exit through the opposite axial end of the ion trap 80 to the end through which the ions entered such that the ions travel into the fragmentation chamber 100. The transmission, or trapping of ions by the ion trap 80 can be selected by adjusting voltages applied to the end electrodes of the ion trap 80. As such, the ion trap 80 may also effectively operate as an ion guide in the second mode of operation. Alternatively, trapped and cooled ions in the ion trap 80 may be ejected from the ion trap 80 in an axial direction into the fragmentation chamber 100. Such ejection may be controlled by application of suitable voltages to the end electrodes of the ion trap 80.

The fragmentation chamber 100, is in the mass spectrometer 10 of FIG. 2, a higher energy collisional dissociation (HCD) device, to which a collision gas is supplied. Sample ions arriving into the fragmentation chamber 100 collide with the collision gas molecules resulting in fragmentation of the sample ions into fragment ions. These fragment ions may be returned from the fragmentation chamber 100 to the ion trap 80 by an appropriate potential applied to the fragmentation chamber 100 and the end electrodes of the ion trap 80. Fragment ions may be cooled and confined in the extraction trap 80, fragment ions may then be ejected from the extraction trap 80 into the mass analyser 90 or mass analysis. The resulting mass spectrum is denoted MS2. For MS2 scans, the transport octupole may also be used to mass filter the sample ions prior to their injection into the ion trap 80 and fragmentation chamber 100. As such, the transport octupole 70 may also be a mass resolving octupole.

Although an HCD fragmentation chamber 100 is shown in FIG. 2, other fragmentation devices may be employed instead, employing such methods as collision induced dissociation (CID), electrically captured dissociation (ECD), electrically transferred dissociation (ETD), photo dissociation and so forth.

Figure 3:
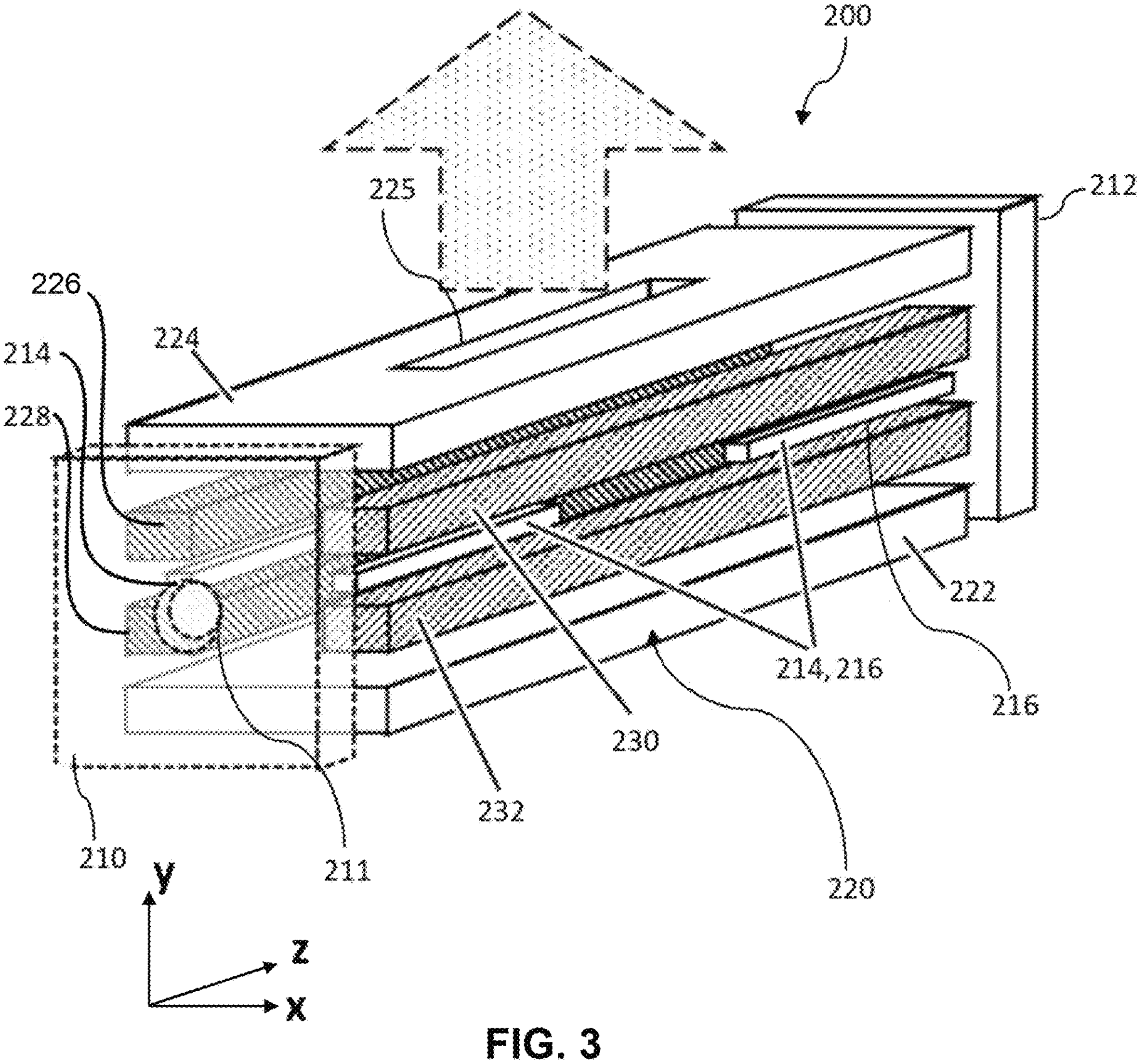
FIG. 3 shows a schematic diagram of an ion trap according to an embodiment of the disclosure.

FIG. 3 shows a schematic diagram of an ion trap 200 according to an embodiment of this disclosure. The ion trap 200 is of a rectilinear geometry. As such, the ion trap 200 may be used in place of the ion trap 80 shown in the mass spectrometer of FIG. 2. It will be understood that the ion trap 200 may be provided in a linear form, as shown, or alternatively, in a curved form similar to a C-trap.

The ion trap 200 of FIG. 3 comprises a first end electrode 210, a second end electrode 212, a first confining electrode 214, a second confining electrode 216, and a multipole electrode assembly 220. The multipole electrode assembly 220 and the first and second confining electrodes 214, 216 are arranged between the first end electrode 210 and the second end electrode 212. The first end electrode 210 and the second end electrode 212 in this example are in the form of plate electrodes. Each of the first end electrodes 210 and the second end electrode 212 have an ion aperture 211, 213 provided centrally therein for transmission of the ions therethrough. Ions, for example, may enter and/or exit the ion trap 200 axially through the ion aperture 211 in the first end electrode 210 or through the ion aperture 213 in the second end electrode 212.

The multipole electrode assembly 220 shown in FIG. 3 comprises a plurality of elongate electrodes arranged about a central axis to define an elongate ion channel. The multipole electrode assembly includes an elongate push electrode 222 and an opposing elongate pull electrode 224. The elongate push electrode 222 and the elongate pull electrode 224 are spaced apart on opposing sides of the elongate ion channel. The elongate push electrode 222 and the elongate pull electrode 224 are aligned substantially in parallel with each other along the length of the elongate ion channel. As shown in FIG. 3, the elongate push electrode 222 and the elongate pull electrode 224 have substantially flat opposing surfaces. In some embodiments, the opposing surfaces may have a hyperbolic profile. The elongate pull electrode 224 includes a pull electrode aperture 225 at a point along its length. As shown in FIG. 3, the pull electrode aperture 225 is located in a relatively central region of the elongate pull electrode 224. The pull electrode aperture 225 runs through the thickness of the electrode and provides a path for ions to exit the ion trap 200 in a direction generally transverse the axial direction of the ion trap 200. In this way, the ions can be extracted from the ion trap 200 in a direction towards and into the mass analyser 90 as shown in FIG. 2. The pull electrode aperture 225 may be aligned to coincide with the ion confining region of the ion trap 200, as discussed further below.

The multipole electrode assembly also comprises first elongate split electrodes 226, 228 and second elongate split electrodes 230, 232. The first elongate split electrodes 226, 228 are spaced apart on an opposing side of the elongate ion channel to the second elongate split electrodes 230, 232. The first and second elongate split electrodes 226, 228, 230, 232 are aligned substantially in parallel with each other along the length of the elongate ion channel. The first elongate split electrodes 226, 228 and second elongate split electrodes 230, 232 are spaced apart across the elongate ion channel in a direction which is transverse to the direction in which the elongate push electrode 222, and elongate pull electrode 224 are spaced apart in. As such, the first and second elongate split electrodes 226, 228, 230, 232, the elongate push electrode 222, and the elongate pull electrode 224 define a boundary for the elongate ion channel having a generally rectangular cross-section.

The first elongate split electrodes 226, 228 may be formed from two elongate rod-shaped electrodes. The two elongate rod electrodes are spaced apart such that the first and second confining electrodes may be provided between the two first elongate split electrodes. The two elongate rod-shaped electrodes may be aligned in parallel along the length of the ion channel.

The second elongate split electrodes 230, 232 may also be formed from two elongate rod-shaped electrodes. As shown in FIG. 3, the two second elongate split electrodes 230, 232 are spaced apart such that first and second confining electrodes may be provided in the region between the two elongate split electrodes 230, 232.

As shown in FIG. 3, it will be appreciated that the elongate push electrode 222, the elongate pull electrode 224, the first elongate split electrodes 226, 228, and the second elongate split electrodes 230,232 are arranged to form a quadrupole ion trap.

The multipole electrode assembly 220 is configured to confine ions in the radial direction of the ion trap. The elongate multipole electrode assembly 220 is configured to receive an RF varying potential in order to confine the ions. The RF varying potential may be applied across opposing pairs of elongate electrodes of the multipole electrode assembly 220 to form the pseudopotential well. For example, according to one embodiment, the multipole electrode assembly 220 may be arranged to apply RF potentials to the elongate ion channel with an amplitude of at least 10 V, more preferably at least 50 V, and no greater than 10,000 V, more preferably no greater than 5,000 V, centred around 0 V. Of course, the skilled person will appreciate that the exact RF potential amplitude and frequency may be varied depending on the construction of the multipole electrode assembly 220 and the ions to be confined. For example, in some embodiments, the multipole electrode assembly 220 may be supplied with a sinusoidal voltage varying at a frequency of 4.5 MHz and an amplitude of 1000 V.

The elongate electrodes of the multipole electrode assembly 220 may also have a DC potential applied to them. Preferably, the DC potential of the elongate electrodes is 0V.

The multipole electrode assembly 220 extends between the first and second end electrodes 210, 212. The overall length of the ion trap (i.e. the spacing between the first and second end electrodes 210, 212) may be at least 20 mm. Such a length provide time for the ions to cool as the travel along the ion trap. The overall length of the ion trap may also generally be no greater than 300 mm, as lengths above this may not be particularly space efficient.

The multipole electrode assembly 220 defines an ion channel extending along the axial direction of the ion trap 80. Typically the multipole electrode assembly 220 is arranged about the axial direction of the ion trap to define an ion channel having a radius (about a central axis) of at least 1 mm. Typically, the ion channel has a radius of no greater than about 10 mm, but larger radii may be provided if desired. For example, the ion trap of FIG. 3 has an overall length of about 80 mm and a radius 2 mm.

The ion trap 80 is provided within a vacuum chamber. Typically, the vacuum chamber is provided with an inert gas to provide means for cooling the ions within the ion trap. In the embodiment of FIG. 2, the ion trap 80 is provided within a vacuum chamber comprising $N_2$ at about $10^{-4}$ mbar to $10^{-2}$ mbar pressure.

The first and second confining electrodes 214, 216, as shown in FIG. 3 may each be provided as an elongate electrode which are aligned substantially in parallel with both the elongate ion channel, and the second elongate split electrodes 230, 232. The first and second confining electrodes 214, 216 are positioned on opposing sides of the ion confining region of the elongate ion channel. In the embodiment of FIG. 3, the ion confining region of the elongate ion channel is a central region of the elongate ion channel. As such, the first and second confining electrodes 214, 216 are spaced apart from each other on either side of the central region of the elongate ion channel in order to define an ion confining region between the first and second confining electrodes 214, 216.

The first and second confining electrodes 214, 216 are configured to receive a DC potential of the same polarity as the ions to be confined within the ion trap 80. Accordingly, the first and second confining electrodes 214, 216 when provided with said DC potential create a repulsive potential which directs ions towards the central region of the ion channel, thereby confining ions within the ion confining region of the elongate ion channel. The DC potentials applied to the first and second confining electrodes 214, 216 are described in more detail below.

The first and second confining electrodes 214, 216 shown in FIG. 3 are each elongate electrodes which each extend in the axial direction of the ion trap 200. As such, the elongate electrodes are each aligned with the electrodes of the multipole electrode assembly 220. The elongate electrodes may each extend at least 2 mm in the axial direction. In some embodiments, the elongate electrodes extend at least: 5 mm, 10 mm, 20 mm, or 50 mm. In some embodiments, the elongate electrodes may extend at least 10% of the overall length of the ion trap 200 (i.e. the distance between the first and second end electrodes 210, 212).

The ion confining region extends between first and second confining electrodes of the ion trap 200. As such, the axial length of the ion confining region depends on the spacing between the first and second confining electrodes 214, 216. In some embodiments, the ion confining region may extend in the axial direction at least 2 mm. Ion confining regions which are too short may experience significant space charge effects, or limited ion confinement capacity. In some embodiments, the axial length of the ion confining region is at least 10% of the overall length of the ion trap (between the end electrodes). For example, in some embodiments, the axial length of the ion trap may be at least 2 mm, 3 mm, 5 mm or 10 mm. In some embodiments, the axial length of the ion confining trigon may be no greater than 20% of the overall length of the ion trap. For example, the axial length may be no greater than 20 mm, 15 mm, or 12 mm.

In the embodiment of FIG. 3, the first and second confining electrodes are provided as rod-shaped electrodes. Of course, it will be appreciated the first and second confining electrodes may be provided with any suitable shape for providing repulsive DC potentials on either side of the ion confining region.

Figure 6:
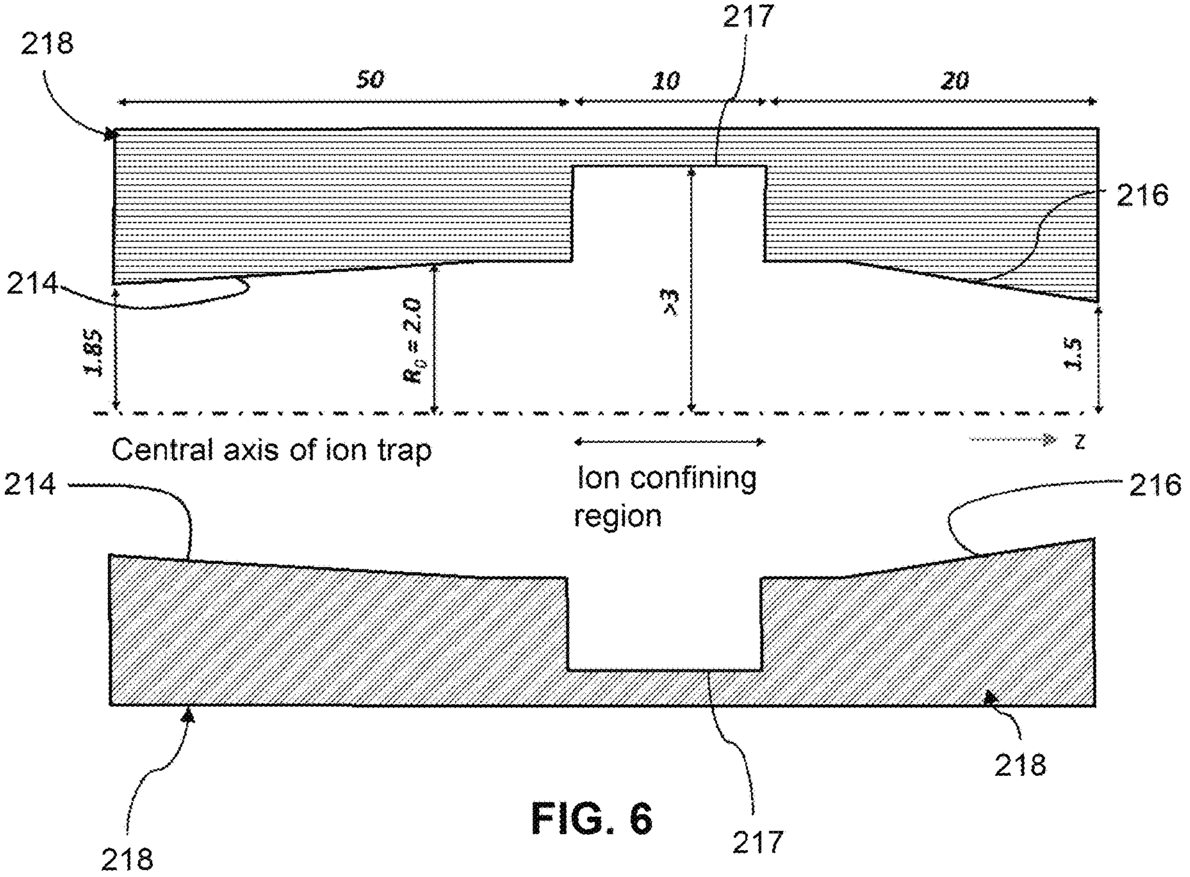
FIG. 6 shows a diagram of a pair of slotted electrodes.

For example, FIG. 6 shows a further example a slotted electrode 218 which can be used to provide the first and second confining electrodes 214, 216. As shown in FIG. 6, the slotted electrode 218 comprises a region defining the first confining electrode 214 (first confining electrode region) and a region defining the second confining electrode 216 (a second confining electrode region). The first confining electrode region and the second confining electrode region are separated by a slot 217 formed in the slotted electrode 218, wherein the slot 217 is aligned with the ion confining region (extraction region) of the of the ion channel.

The slotted electrode 218 may be provided as a substantially planar electrode (i.e. a plate electrode). The slotted electrode 218 may be provided between electrodes of the multipole electrode assembly 220 in a similar manner to the first and second confining electrodes 214, 216 of the embodiment shown in FIG. 3. As shown in FIG. 6, a pair of slotted electrodes 218 may be provided on opposing sides of the ion trap 200.

The slotted electrode 218 may be arranged in the ion trap such that the slot 217 is aligned in a direction generally transverse to the axial direction. For example, where the slotted electrode is a plate electrode, the plate may be arranged along a plane intersecting the central axis of the ion trap. The slotted electrode 218 may be positioned relative to the central axis of the ion trap such that the first and second confining electrodes 214, 216 are positioned a similar distance from the central axis as the electrodes of the multipole electrode assembly 220. For example, in the example of FIG. 6, the multipole electrode assembly 220 may be located about 2 mm from the central axis in the radial direction. Thus, in regions towards the ion confining region, the first and second confining electrodes 214, 216 are positioned a similar distance from the central axis as the electrodes of the multipole electrode assembly 220. It will be appreciated from FIG. 6 that the first and second confining electrodes may extend in the radial direction a variable amount along the axial direction of the ion trap. As such, the spacing of the first confining electrode 214 and/or the second electrode 216 from the central axis of the ion channel may vary along the length of the ion trap. In the embodiment of FIG. 6, the spacing of the first and second confining electrodes 214, 216 from the central axis increases along the axial direction from the ends of the multipole electrode assembly towards the ion confining region of the ion channel.

For example, in the example of FIG. 6, the first confining electrode 214 is spaced apart from the central axis by 1.85 mm at the end of the slotted electrode closest to the first end electrode 210. The spacing of the first confining electrode 218 increases towards the ion confining region up to a spacing of 2 mm. As such, the first confining electrode region of the slotted electrode is generally wedge shaped. In some embodiments, the spacing may vary in a linear manner, or, as shown in FIG. 6 a combination of a linear gradient and section of constant spacing. In other embodiments, other variable spacing profiles may also be provided including one or more sections of: constant spacing, linear gradient, nonlinear gradients such as curves or exponential gradients. Such variable spacing helps to guide ions towards the ion confining region, as the DC potential is applied closer to the central axis of the ion trap in regions further away from the ion confining region.

The second confining electrode 216 also has a varying spacing from the central axis of the ion trap. In some embodiments, the spacing may vary in a similar manner to the first confining electrode, while in the example of FIG. 6, the variable spacing is different. As shown in FIG. 6, the spacing from the central axis at the end of the slotted electrode 218 closest to the second end electrode 212 is 1.5 mm, while closest to the ion confining region the spacing is 2 mm. As such, the second confining electrode region of the slotted electrode is generally wedge shaped.

In the slot 217 region of the slotted electrodes, the slot 217 is provided such that the material of slotted electrode is recessed in the radial direction. The slot 217 of the slotted electrode 218 is provided such that any material of the slotted electrode 218 is recessed at least 3 mm from the central axis of the ion confining region. As such, the slot has a depth relative to the first and second confining electrode regions of at least 1 mm.

The slot 217 of the slotted electrode 218 corresponds to the axial length of the ion confining region. In the slotted electrode of FIG. 6, the slotted electrode 218 has a slot 217 which extends 10 mm in the axial direction. In the embodiment of FIG. 6, the slotted electrode is located closer towards the second end electrode 212 than the first end electrode 210.

As shown in FIG. 6, a pair of slotted electrodes are provided. The pair of slotted electrodes are provided on opposing sides of the ion channel. The slots 217 of each slotted electrode 218 are aligned on opposing sides of the ion confining region.

Accordingly, the slotted electrode 218 may be used to provide first and second confining electrodes 214, 216 in a space efficient design. The first and second confining electrodes 214, 216 may also be provided with variable spacing relative to the central axis of the ion trap in order to improve ion focusing towards the ion confining region of the ion trap.

Figure 8:
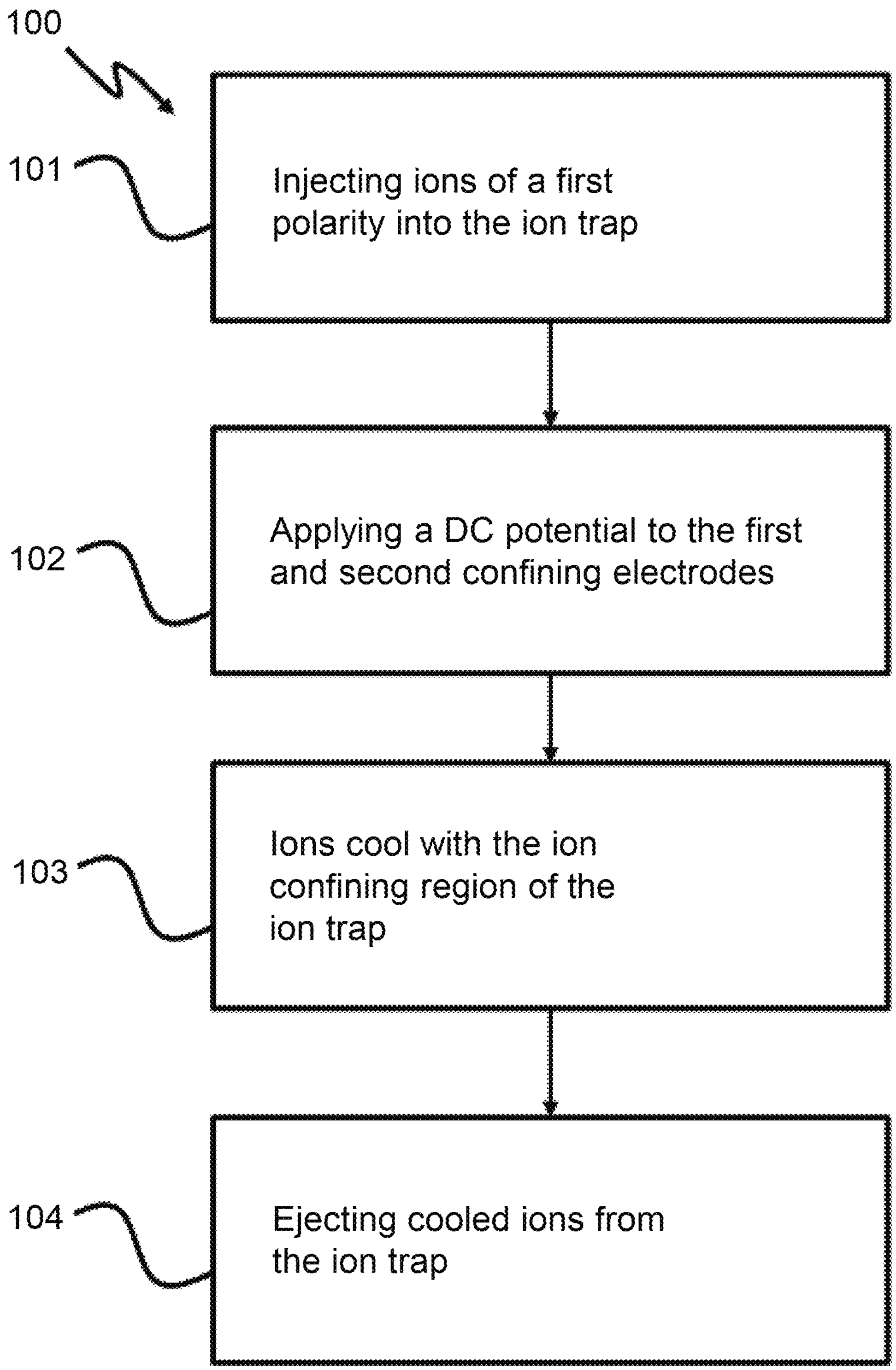
FIG. 8 shows a flow chart of a method of injecting ions into an ion trap according to an embodiment of the disclosure.

Next, a method of injecting ions into an ion trap will be described with reference to the mass spectrometer 10 as shown in FIG. 2 and the ion trap 200 as shown in FIG. 3. A flow chart of a method 100 of injecting ions into an ion trap is shown in FIG. 8.

The mass spectrometer 10 is under the control of a controller (not shown) which, for example is configured to control the generation of sample ions in the ESI source 20 to set the appropriate potentials on the electrodes of the ion transportation means described above so as to guide, focus, and filter (where the ion transport means comprises a mass selector) the sample ions, to capture the mass spectral data form the mass analyser 90, and so forth. It will be appreciated that the controller may comprise a computer than may be operated according to a computer program comprising instructions to cause the mass spectrometer 10 to execute the step of the method according to the present disclosure.

It is to be understood that the specific arrangement of components shown in FIG. 2 is not essential to the methods subsequently described herein. Indeed, other mass spectrometer arrangements may be suitable for carrying out the method of injecting ions into an ion trap 80, 200 according to this disclosure. According to the embodiment of the method, sample molecules are supplied from a LC column as part of the apparatus described above. In some embodiments, the sample molecules may be supplied from the LC column over a duration corresponding to a duration of a chromatographic peak of the sample supplied form the LC column. As such, the controller may be configured to perform the method within a time period corresponding to the width (duration) of a chromatographic peak at its base.

As shown in FIG. 2, an orbital trapping mass analyser 90 is utilised to mass analyse the sample ions which are injected into the ion trap 80. In order to inject ions into the ion trap, the sample molecules from the LC column are ionized using the ESI source 20 to produce sample ions. The ESI source 20 may be controlled by the controller to generate sample ions with a first charge. The first charge may be a positive charge or a negative charge. According to the method described herein, the sample ions are positively charged (i.e. having a positive polarity).

Sample ions subsequently enter the vacuum chamber of the mass spectrometer 10. The sample ions are directed through capillary 25, RF only S lens 30, injection flatapole 40, bent flatapole 50, and into the transport multipole 70 as described above. Sample ions may then pass into the ion trap 80 where they are accumulated. Accordingly, sample ions of a first charge may be transported to, and injected into, ion trap 80 according to the steps described above. As such, in a first step 101 of the method 100, ions of a first polarity are injected into the ion trap 80.

Next, the control of the ion trap 80 will be described in more detail with reference to the ion trap 200 shown in FIG. 3.

In a first time period, the controller controls the ion transportation means such that ions enter the ion trap 80, 200. During the first time period, the controller may be configured to apply a first DC potential to the first end electrode 210 and to the second end electrode 212 such that the injected ions are confined within the ion channel of the ion trap 200. During the first time period, the first DC potential applied to the first and second end electrodes 210, 212 may have the same polarity as the injected ions, such that ions are confined within the ion trap. In some embodiments, during the first time period, an initial DC potential may be applied to the end electrode through which ions enter (e.g. the first end electrode 210), which is reduced relative to the first DC potential applied to the opposing end electrode while ions travel through aperture of the electrode. The first DC potential may then be applied to the first end electrode 210 after the ions have entered the ion trap 200 through the aperture 211 shown in the first end electrode 210.

For example, in some embodiments, the initial DC potential applied to the first end electrode 210 may be 0 V while ions are travelling through the first end electrode 210. The first DC potential may then be applied to the first end electrode 210 after all the ions have entered the ion trap 200, but before any of the ions have had time to reflect of the second end electrode 212 and travel back towards the first end electrode 210. The first DC potential applied to the first and second end electrodes 210, 212 is of the same charge as the sample ions. As such, for positively charged ions, the controller is configured to apply a positive first DC potential to the first end electrode 210 and to the second end electrode 212 to confine the positively charged sample ions during the first time period. The first DC potential applied to the first and second end electrodes 210, 212 acts to repel the sample ions in the axial direction towards the central region of the elongate ion channel. As such, the sample ions are initially confined by the first DC potential applied to the first and second end electrodes 210, 212. For example, the first DC potential applied to the first and second end electrodes 210, 212 may be +10 V.

During the first time period when ions enter the ion trap 80, 200, the ions may have a relatively high amount of energy. While DC potentials can be applied to the first and second confining electrodes during the initial injection period, due to the ions relatively high energy, in some embodiments the second DC potentials applied to the first and second confining electrodes 214, 216 may be relatively small, or even zero while ions are entering the ion trap. This allows the ions entering the ion trap to travel the full length of the ion trap initially, which promotes cooling of the ions. Once the ions have entered the trap and begun to cool, the second DC potentials applied to the first and second confining electrodes 214, 216 may then be increased to third DC potentials, in order to confine the ions in the ion confining region. For example, during the first time period, the second DC potentials applied to the first and second confining electrodes 214, 216 may be 0 V. In some embodiments, the second DC potentials may be less than the first DC potentials applied to the first and second end electrodes 210, 212. For example, the second DC potentials may be no greater than: 70%, 50%, 30%, 20% or 10% of the first DC potential. In some embodiments, the second DC potential may be no greater than 7 V, 5 V, 3 V, 2 V or 1 V. As such, in step 102 of the method 100, one or more DC potentials may be applied to the first and second confining electrodes to confine ions within the ion trap.

The controller is also configured to apply an RF potential to the multipole electrode assembly 220 such that a pseudopotential well is formed in the elongate ion channel. The frequency of RF potential in some embodiments may be at least 3 MHz, and the RF potential may oscillate between −500 V and +500 V for example.

The first time period provides a duration over which ions are injected into the ion trap 80, 200. The duration of the first time period will depend on the number of ions to be injected into the ion trap. The duration of the first time period may also depend on the length of the ion trap and the time taken for ions to travel the length of the ion trap and reflect back towards the end electrode where ions are entering the ion trap. In some embodiments, it may be desirable for the first time period to be no greater than a time period for ions to travel along the ion trap and back to the end electrode where ions enter the ion trap. For example, the first time period may have a duration of at least: 100 μs, 200 μs, 500 us or 1 ms, in order to allow a suitable number of ions to enter the ion trap. In some embodiments, the first time period may have a time period of no greater than: 10 ms, 5 ms, 3 ms or 2 ms.

Figure 4:
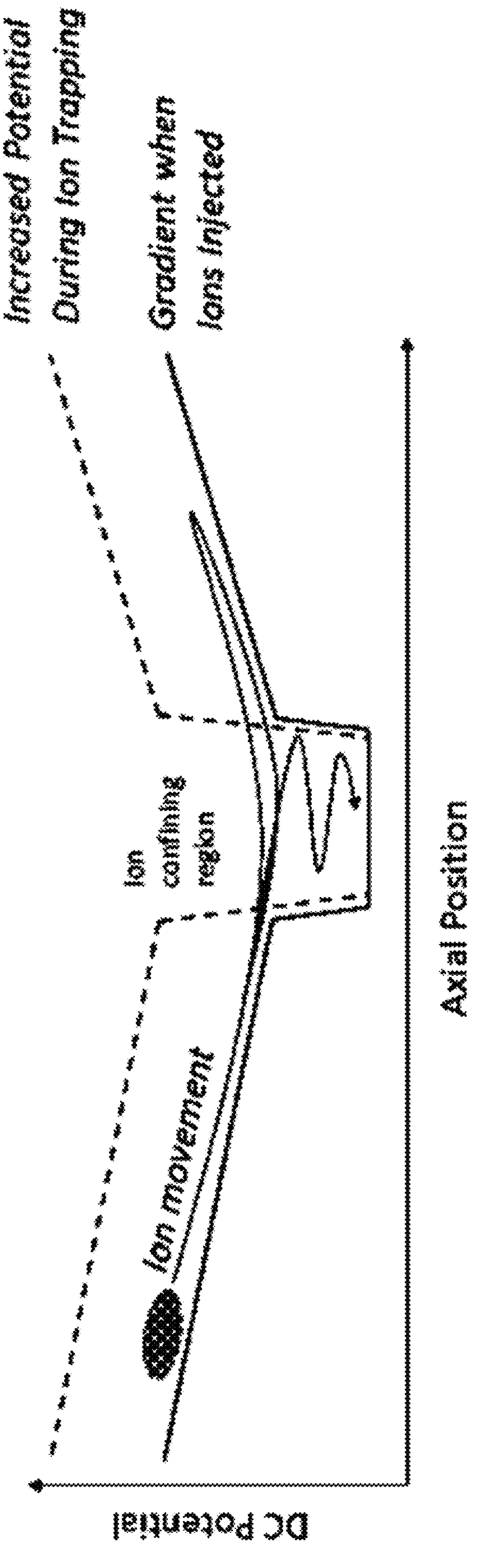
FIG. 4 shows a schematic diagram of ion travel in the axial direction of the ion trap relative to ion potential.

Once ions the ion injection process is completed, the controller is configured to control the ion trap in order to cool the ions and to confine the ions to the ion confining region of the ion trap. After the ion injection process, the ions are relatively energetic such that they travel between the first and second end electrodes, confined by the first DC potentials applied to the first and second end electrodes 210, 212. An example of the initial ion motion is shown in the graph of FIG. 4.

Once ions are confined between the first and second end electrodes 210, 212, the controller is configured to apply a third DC potential to the first confining electrode 214 and the second confining electrode 216 during a second time period to further confine the ions. The second time period may follow immediately after the first time period when ions enter the ion trap (i.e. the second time period commences when ions finish entering the ion trap). In some embodiments, there may be a short cooling time period between the first and second time periods, to allow the ions to further cool in the trap. The cooling time period may have a duration of no greater than e.g. 2 ms such that the overall duration of ion cooling for the ion trap does not become excessive. As such, during step 103 of the method 100, ions may cool within the ion confining region of the ion trap.

During the second time period, the first DC potential applied to the first and second confining electrodes 214, 216 may be provided independently of the third DC potentials applied to the first and second confining electrodes 214, 216. The third DC potential applied to the first and second confining electrodes 214, 216 is provided to confine the sample ions in an ion confining region of the elongate ion channel. The third DC potential is of the sample polarity as the ions. As the ions in the second time period are generally cooling towards the centre of the ion trap (away from the end electrodes), the third DC potentials applied to the first and second confining electrodes repel ions away from the first and second confining electrodes 214, 216 towards the ion confining region of the elongate ion channel. FIG. 4 further shows how application of the third DC potentials to the first and second confining electrodes increases the ion confinement in the ion confining region of the ion trap.

In some embodiments, the third DC potential applied to the first and second confining electrodes is the same as the second DC potential. Preferably, the magnitude of the third DC potentials applied to the first and second confining electrodes is increased relative to the second DC potentials applied in the first time period. By increasing the DC potential applied to the first and second confining electrodes in the second time period, the ion confinement may be increased without adversely affecting ion trapping in the regions away from the ion confinement region, as ions are already generally confined to the ion confining region. That is to say, the effect of increasing the DC potentials on the first and second confining electrodes 214, 216, which may distort the trapping pseudopotential away from the ion confinement region, has a reduced effect on ion retention in the ion trap at this point. For example, in some embodiments, the third DC potentials applied to the first and second end electrodes 210, 212 may be about +5 V.

As mentioned above, FIG. 4 shows a schematic diagram of ion motion in the ion trap under the DC potentials applied to the end electrodes and the first and second confining electrodes 214, 216. As shown in FIG. 4, by applying the second and third DC potentials to the first and second confining electrodes 214, 216, a first potential well may be formed in the central region of the elongate ion channel which confines the sample ions in the ion confining region of the elongate ion channel. As such, the first potential well may be formed relative to the DC potential of the multipole electrode assembly 220. A magnitude of the first potential well may be defined as the energy required for an ion trapped at the bottom of the well to escape the potential well. A polarity of the potential well may be defined based on the polarity of the ions it is intended to confine. For example, a potential well with a negative polarity will confine positive ions and a well with a positive polarity will confine negative ions.

FIG. 4 shows a schematic diagram of the DC potential along the axial direction of the ion trap around the ion confining region of the ion trap 200. As shown in FIG. 4, a potential well is formed in an ion confining region of the ion trap. The potential well extends in the axial direction of the elongate ion channel of the ion trap 200 in order to axially confine the sample ions. The potential well formed between the first and second confining electrodes 214, 216 may also be formed with respect to the first and second end electrodes 210, 212. As shown in FIG. 4, the potential in the ion confining region is a low point of the ion trap in the axial direction. This is due to the distance from the first and second end electrodes, and also due to the first and second confining electrodes which are proximal to the ion confining region. Close to the first and second confining electrodes 214, 216 in the ion confining region, there is a steep, step-like change in the DC potential between the ion confining region of the ion trap, and regions of the ion trap over which the first and second confining electrodes 214, 216 extend. Between the first ion confining electrode and the first end electrode, the DC potential further increases towards the first end electrode, due to the difference in DC potentials (first confining electrode at e.g. 5 V, first end electrode at e.g. 10 V).

As shown in FIG. 4, ions within the ion channel are initially confined between the first and second end electrodes 210, 212. As ions cool within the ion channel, they lose energy and are focused towards the ion confining region. Once ions are sufficiently cool, they no longer have the energy to escape the potential well of the ion confining region, where they are further cooled and confined.

Figure 5A:
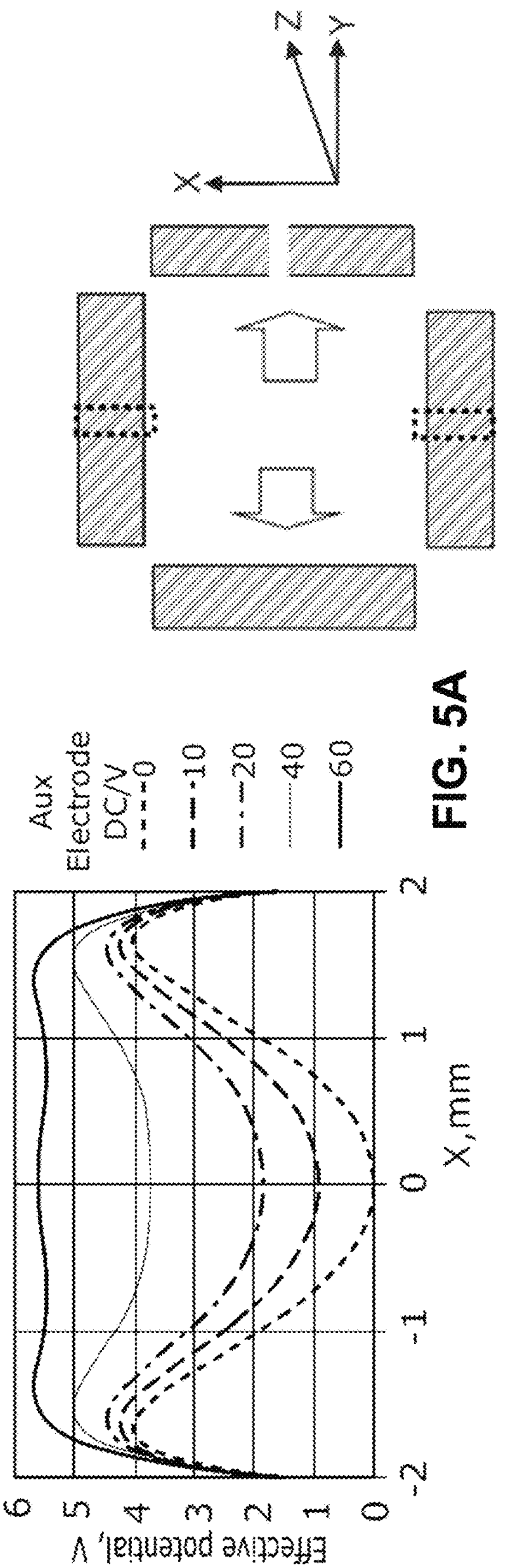
FIG. 5A shows a graph of the variation in potential in the ion trap in a radial direction transverse to the axial direction.
Figure 5B:
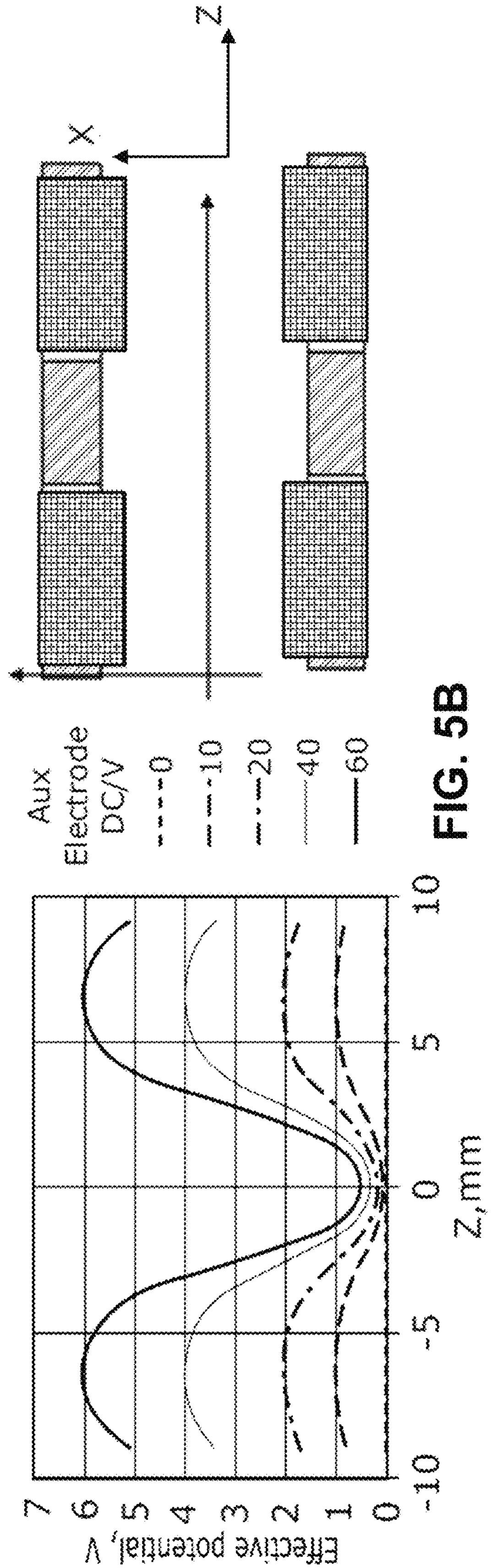
FIG. 5B shows a graph of the variation in potential in the ion trap along an axial direction of the ion trap.

FIGS. 5A and 5B are diagrams providing further explanation of the effect of varying the DC potentials applied to the first and second confining electrodes for an ion trap 200 according to this disclosure. FIG. 5A shows a graph of the pseudopotential well formed along the radial direction (x-direction) of the ion trap for different DC potentials (i.e. second or third potentials) applied to the first and second confining electrodes. The graph of FIG. 5A shows the pseudopotential well in the x-direction for a cross-section at a point along the ion trap overlaps with one of the first and second confining electrodes 214, 216. FIG. 5B shows a graph of the pseudopotential well formed along the axial direction (z-direction) of the ion trap for different DC potentials (i.e. second or third potentials) applied to the first and second confining electrodes. The graph of FIGS. 5A and 5B are the result of simulations of an ion trap having the cross-sections shown in FIGS. 5A and 5B. The multipole electrode assembly 220 in the simulation of FIGS. 5A and 5B has an RF potential of 500 V at 3 MHz for an ion having a mass to charge ratio of 500.

As shown in FIG. 5A, increasing the DC potential applied to the first and second confining electrodes 214, 216 reduces the depth of the pseudopotential well in the radial direction of the ion trap. Thus, it can be advantageous to reduce the DC potential applied (second DC potential) to the first and second confining electrodes 214, 216 when ions first enter the ion trap 200, as the ions may be relatively energetic. Once ions have begun to cool in the ion trap, the DC potential applied to the first and second confining electrodes 214, 216 may be increased (third DC potential), without adversely effecting ion confinement in the radial direction. As shown in FIG. 5B, increasing the DC potential applied to the first and second confining electrodes increases the depth of the potential well in the axial direction. Thus, ions become increasingly confined within the ion confining region.

As such, the spatial distribution of the ions within the ion trap 200 may be reduced by confining the ions within the ion confining region of the elongate ion channel by the potential well. By confining ions in the potential well through application of the first DC potential to the first and second confining electrodes 214, 216, the initial DC potential applied to the first and second end electrodes 210,212, may no longer be required to axially confine the sample ions within the ion trap 200. Accordingly, the positively charged ions may be confined (axially confined and radially confined) within the elongate ion channel of the ion trap 200 through a combination of the first DC potentials applied to the first and second end electrodes 210, 212, the second DC potential (and optionally third DC potential) applied to the first and second confining electrodes 214, 216 and the RF potentials applied to the multipole electrode assembly 220.

Figure 1:
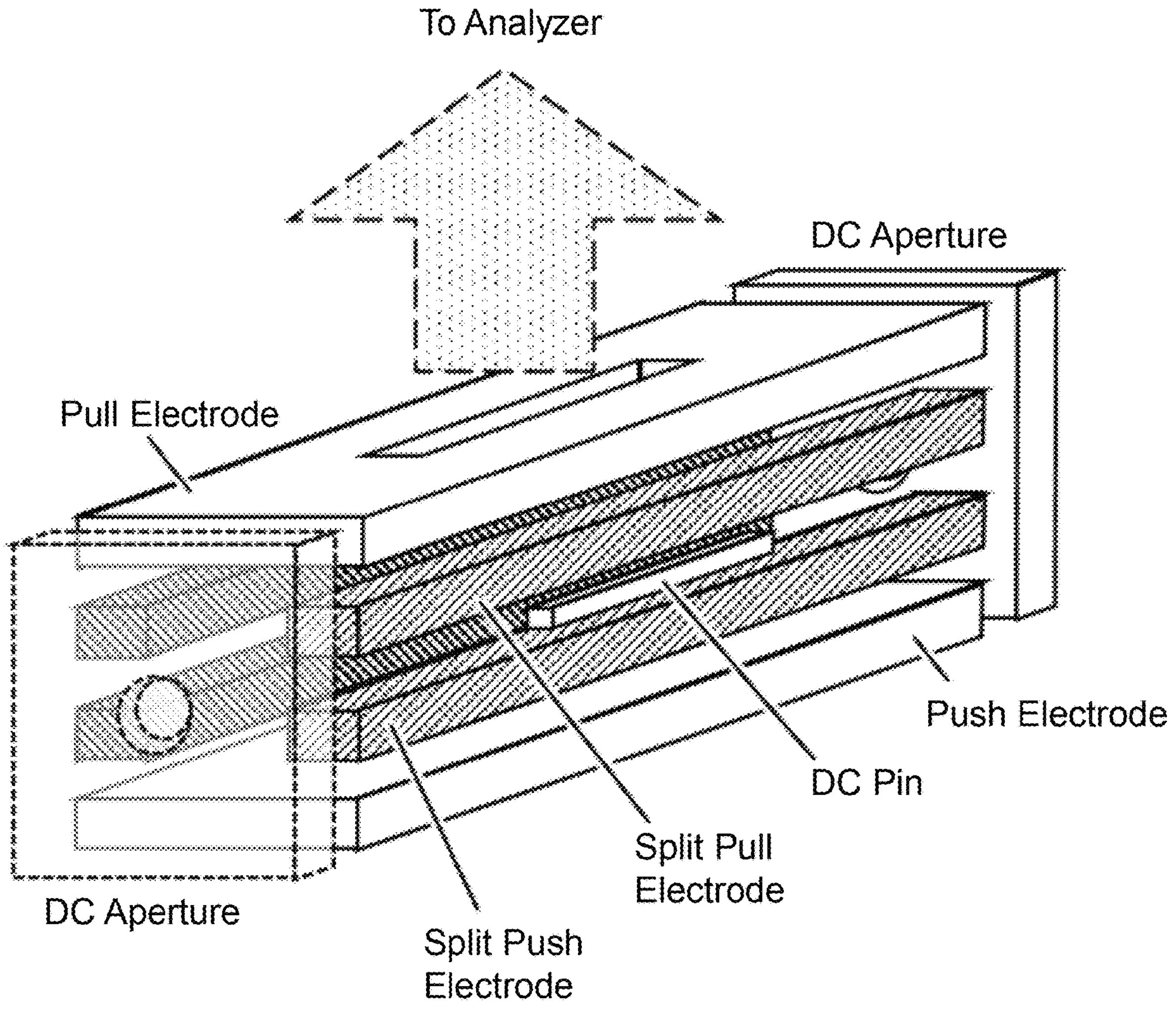
FIG. 1 (Prior Art)
FIG. 1 shows an example of an ion trap known from GB-A-2570435.

Ions that become confined within the ion confining region of the ion trap 200 may be stored within the ion trap by maintaining the second or third DC potential applied to the first and second confining electrodes 214, 216. The ions stored within the ion trap 200 may then be ejected from the ion trap for further processing by the mass spectrometer 10 of FIG. 1. Ions may be ejected from the ion trap 200 in the axial direction through either aperture 211 or 213 or in a direction transverse to the axial direction through the pull electrode aperture 225.

Ions may be ejected in the axial direction through application of DC potentials to the end electrodes to direct ions through one of the apertures 211, 213.

Ions may also be ejected through the pull electrode aperture 225 through application of a push DC potential to the elongate push electrode 222 and a pull DC potential to the opposing pull electrode 224 in order to eject the sample ions from the ion trap 200. A push DC potential is a DC potential configured to push (i.e. repel) ions, while a pull DC potential is a DC potential configured to pull (i.e. attract) ions. Preferably, the RF potential is not applied to the multipole electrode assembly 220 whilst ejecting the sample ions from the ion trap 200. For example, for the positive ions in the method described above, the controller may be configured to apply a negative DC potential to the pull electrode 224 (e.g. −500 V) and a positive DC potential (e.g. +500 V) to the push electrode 222. Accordingly, positively charged sample ions may be ejected from the ion trap 200 through the aperture 225 of the elongate pull electrode 224. By reducing the spatial distribution of the sample ions prior to ejection of the ions from the ion trap 200, the spatial distribution of the sample ions as they are ejected from the ion trap 200 may also be reduced. This results in an increased efficiency in transmission of the sample ions (sample ion packet) from the ion trap 200 to the mass analyser as the sample ions may be more accurately focused into the mass analyser. As such, in step 104 of method 100, cooled ions may be ejected from the ion trap 80, 200.

As shown in the mass spectrometer 10 of FIG. 2, ions ejected from the ion trap 80, are ejected through a relatively narrow series of focusing lenses 95 before entering into the mass analyser 90. The skilled person will appreciate that the focusing lenses 95 have relatively narrow apertures which define a relatively narrow ion path to the mass analyser 90. Typically, the narrow ion path is about a few hundred μm in width. Thus, by reducing the spatial distribution of the ions within the ion trap 80, the proportion of ions that can be successfully focused along the relatively narrow ion path and into the mass analyser 90 is increased. As such, use of the ion trap 80 according to embodiments of this disclosure results in an increase in transmission efficiency from the ion trap 80 to the mass analyser 90.

Figure 7A:
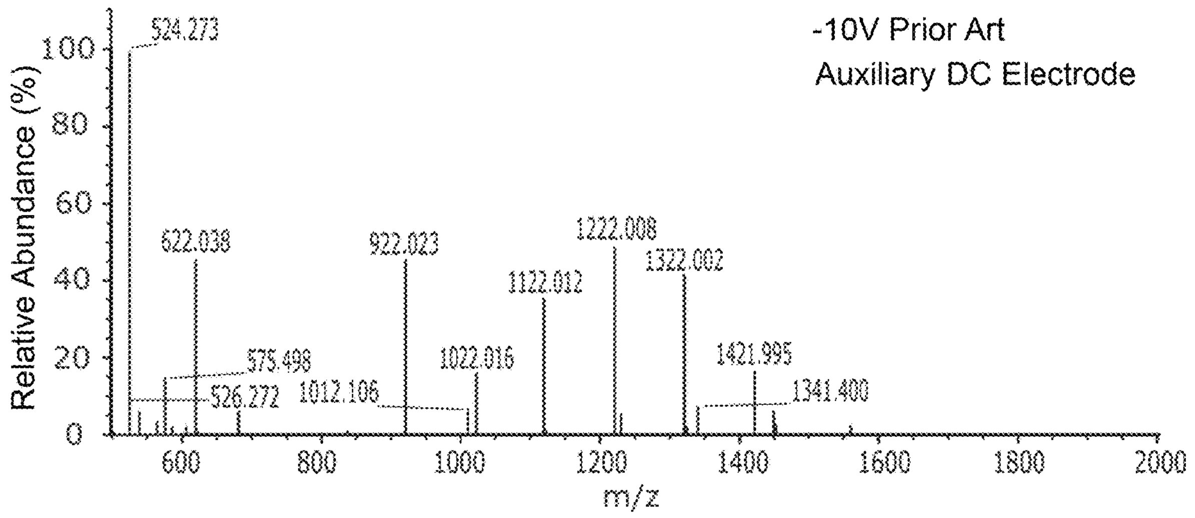
FIG. 7A shows a graph of a mass analysis scan for a mass spectrometer incorporating the ion trap of GB-A-2570435.
Figure 7B:
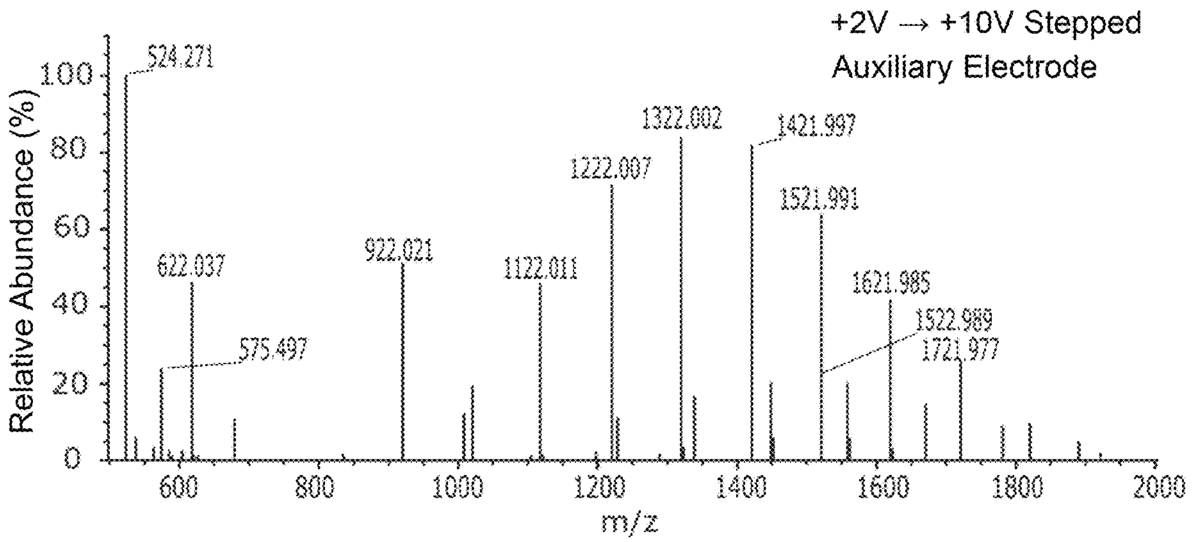
FIG. 7B shows a graph of a mass analysis scan for a mass spectrometer incorporating an ion trap according to an embodiment of the disclosure.

A comparative example of the effect of the ion trap according to embodiments of this disclosure is shown in FIGS. 7A and 7B. FIG. 7A shows a mass spectrum obtained using a mass spectrometer, where ions were injected into the mass spectrometer from an ion trap as described in GB-A-

2570435. In the comparative example of FIG. 7A, a DC potential of −10 V was applied to the pin electrode located in the ion confining region. FIG. 7B shows a mass spectrum obtained under the same experimental conditions as FIG. 7A using the ion trap as described in FIG. 3 of this disclosure. In the example of FIG. 7B, a second DC potential of 2 V was applied during ion injection (first time period) followed by a third DC potential of +10 V (second time period). It will be appreciated that the mass spectrum of FIG. 7B shows a greater abundance of ion species, particularly of high m/z species. This is due to the improved ion confinement of the ion trap of this disclosure, which in turn improves the efficiency of the ion injection into the mass analyser.

While the ion trap 200 of this disclosure comprises first and second end electrodes 210, 212 it will be appreciated that in other embodiments, the ion trap 200, 80 may be provided without out end electrodes 210, 212. In some embodiments, ion injection into the ion trap may be controller by other ion transport components of a mass spectrometer. For example, in the embodiment of FIG. 2, ion injection may be controlled by the transport multipole 70.

It will be appreciated that once injected into the ion trap, ions may be controlled by the potential well provided by the first and second confining electrodes (see e.g. FIG. 5B). The confining potential of the first and second confining electrodes may be further increased by providing the first and second confining electrodes 214, 216 with a wedge shaped profile (for example as shown with the slotted electrodes 218 of FIG. 6). By providing such a wedge shaped electrode (i.e. where the spacing of the first confining electrode 214 and/or the second electrode 216 from the central axis of the ion channel increases from the ends of the multipole electrode assembly towards the ion confining region of the ion channel) the confining potential of the ion trap may be increased.

In some embodiments, the first and second confining electrodes 214, 216 may provide a bridging functionality between the ion trap 80 and adjacent ion transport devices (e.g. transport multipole 70 in the mass spectrometer of FIG. 2). As such, the first and/or second confining electrodes may extend beyond the ends of the multipole electrode assembly 220 towards the adjacent ion transport device in order to bridge the gap between the ion trap 80 and the transport multipole. Such bridging of the ion trap may allow ion injection into the ion trap 80 to be controlled by the first and/or second confining electrode 214, 216.

Accordingly, the ion traps and methods of injecting ions into an ion trap according to this disclosure provide improved ion cooling and ion confinement. In particular, the ion traps 200 are well suited to efficiently confining ions, particularly high mass to charge ratio ions, for injection into further mass spectrometry devices such as a mass analyser.

It will be appreciated that the present disclosure is not limited to the embodiments described above, and that modifications and variations on the embodiments described above will be readily apparent to the skilled person. Features of the embodiments described above may be combined in any suitable combination with features of other embodiments described above, as would be readily apparent to the skilled person. As such, the specific combinations of features described in the above embodiment should not be understood to be limiting.

The invention claimed is:

1. An ion trap for cooling ions of a first polarity for mass spectrometry comprising:

a pull electrode having an aperture therethrough and a push electrode spaced apart from the pull electrode;

a multipole electrode assembly disposed between the pull electrode and the push electrode and configured to confine ions of the first polarity to an ion channel extending in an axial direction of the multipole electrode assembly; wherein the push electrode and pull electrode are spaced apart in a direction transverse to the axial direction;

a first confining electrode provided adjacent to the multipole electrode assembly and extending in the axial direction of the multipole electrode assembly; and a second confining electrode provided adjacent to the multipole electrode assembly and extending in the axial direction of the multipole electrode assembly aligned with the first confining electrode, wherein the first and second confining electrodes are spaced apart in the axial direction said spacing apart defining an ion confining region of the ion channel between the first and second confining electrodes, wherein the first and second confining electrodes are configured to receive a DC potential of the first polarity to further confine ions within the ion channel in the ion confining region, and wherein the aperture of the pull electrode is aligned with the ion confining region such that ions are ejected from the ion trap upon application of a push DC potential to the push electrode and a pull DC potential to the pull electrode.

2. An ion trap according to claim 1, wherein the ion trap is configured to cool analyte ions within the ion confining region and subsequently eject the cooled analyte ions to a mass spectrometer for mass analysis.

3. An ion trap according to claim 1, wherein the first confining electrode and the second confining electrode are electrically connected together.

4. An ion trap according to claim 1, wherein the first confining electrode and/or the second confining electrode extend in the axial direction by a distance of at least 2 mm.

5. An ion trap according to claim 4, wherein the first confining electrode and/or the second electrode is spaced apart from a central axis of the ion channel by a variable distance along the ion channel.

6. An ion trap according to claim 5, wherein the spacing of the first confining electrode and/or the second electrode from the central axis of the ion channel increases from the ends of the multipole electrode assembly towards the ion confining region of the ion channel.

7. An ion trap according to claim 1, wherein the first confining electrode and the second confining electrode are provided by a slotted electrode arranged in the axial direction, the slotted electrode comprising a first confining electrode region and a second confining electrode region separated by a slot formed in the slotted electrode, the slot aligned with the ion confining region of the of the ion channel.

8. An ion trap according to claim 7, wherein the slotted electrode is a plate electrode.

9. An ion trap according to claim 1, wherein a plurality of first confining electrodes are provided, the plurality of first confining electrodes distributed evenly about a central axis of the multipole electrode assembly; and wherein a plurality of second confining electrodes are provided, the plurality of second confining electrodes distributed evenly about the central axis of the multipole electrode assembly.

10. An ion trap according to claim 1, further comprising: first and second end electrodes arranged at opposing ends of the multipole electrode assembly.

11. An ion trap according to claim 10, further comprising a controller, the controller configured to:

apply an RF potential to the multipole electrode assembly to confine ions within the ion channel;

apply a first DC potential to the first and second end electrodes; and apply a second DC potential to the first and second confining electrodes.

12. An ion trap according to claim 11, wherein the first DC potential is greater than the second DC potentials.

13. An ion trap according to claim 11, wherein the controller is configured to:

apply the second DC potential to the first and second confining electrodes during a first time period in which ions are entering the ion trap through an aperture in the first end electrode; and apply a third DC potential to the first and second confining electrodes during a second time period after ions have entered the trap, wherein the third DC potential is greater than the second DC potential.

14. An ion trap according to claim 1, wherein the multipole electrode assembly is a quadrupole electrode assembly, a hexapole electrode assembly, or an octupole electrode assembly.

15. An ion trap according to claim 7, wherein a plurality of slotted electrodes are provided, the plurality of slotted electrodes distributed evenly about a central axis of the multipole electrode assembly.

16. An ion trap according to claim 1 wherein the controller is configured to apply voltages to the first and second end electrodes that cause ions to be ejected from the ion trap in an axial direction.

17. An ion trap for cooling ions of a first polarity for mass spectrometry comprising:

a multipole electrode assembly configured to confine ions of the first polarity to an ion channel extending in an axial direction of the multipole electrode assembly;

a first confining electrode provided adjacent to the multipole electrode assembly and extending in the axial direction of the multipole electrode assembly; and a second confining electrode provided adjacent to the multipole electrode assembly and extending in the axial direction of the multipole electrode assembly aligned with the first confining electrode, wherein the first and second confining electrodes are spaced apart in the axial direction in order to define an ion confining region of the ion channel between the first and second confining electrodes, wherein the first and second confining electrodes are configured to receive a DC potential of the first polarity to further confine ions within the ion channel in the ion confining region, and wherein the first confining electrode and the second confining electrode are provided by a slotted electrode arranged in the axial direction, the slotted electrode comprising a first confining electrode region and a second confining electrode region separated by a slot formed in the slotted electrode, the slot aligned with the ion confining region of the of the ion channel.

18. An ion trap according to claim 17, wherein the slotted electrode is a plate electrode.

19. An ion trap according to claim 17, wherein the ion trap is configured to cool analyte ions within the ion confining region and subsequently eject the cooled analyte ions to a mass spectrometer for mass analysis.

20. A mass spectrometer comprising:

an ion trap comprising:

a pull electrode having an aperture therethrough and a push electrode spaced apart from the pull electrode;

a multipole electrode assembly disposed between the pull electrode and the push electrode and configured to confine ions of the first polarity to an ion channel extending in an axial direction of the multipole electrode assembly; wherein the push electrode and pull electrode are spaced apart in a direction transverse to the axial direction;

a first confining electrode provided adjacent to the multipole electrode assembly and extending in the axial direction of the multipole electrode assembly; and a second confining electrode provided adjacent to the multipole electrode assembly and extending in the axial direction of the multipole electrode assembly aligned with the first confining electrode, wherein the first and second confining electrodes are spaced apart in the axial direction, said spacing apart defining an ion confining region of the ion channel between the first and second confining electrodes, wherein the first and second confining electrodes are configured to receive a DC potential of the first polarity to further confine ions within the ion channel in the ion confining region, and wherein the aperture of the pull electrode is aligned with the ion confining region such that ions are ejected from the ion trap upon application of a push DC potential to the push electrode and a pull DC potential to the pull electrode; and a mass analyser configured to receive ions ejected from the ion trap through the aperture of the pull electrode.

* * * * *